Oct. 27, 1959   E. C. CREUTZ   2,910,177
REACTOR COMPONENT
Original Filed May 22, 1945

INVENTOR.
Edward C. Creutz
BY:
Roland A. Anderson
Attorney

# United States Patent Office 2,910,177
Patented Oct. 27, 1959

2,910,177

REACTOR COMPONENT

Edward C. Creutz, Pittsburgh, Pa., assignor to the United States of America as represented by the United States Atomic Energy Commission Original application May 22, 1945, Serial No. 595,182. Divided and this application September 17, 1951, Serial No. 246,945

5 Claims. (Cl. 206—84)

This invention relates to neutronic reactors and to a novel article of manufacture used in and in combination with such reactors. This patent is a division of application Serial No. 595,182, filed May 22, 1945.

In neutronic reactors, a neutron fissionable isotope such as $U^{233}$, $U^{235}$, or $94^{239}$ or a mixture thereof is subjected to fission by absorption of neutrons and a self-sustaining chain reaction is established by the neutrons evolved by the fission. In general such reactors comprise bodies of compositions containing such fissionable material, for example, as natural uranium, disposed in a neutron slowing material which slow the neutrons to thermal energies. Such a slowing material is termed a neutron moderator. Carbon, beryllium, and $D_2O$ are typical moderators suitable for such use. Heat is evolved during the reaction which is removed by passage of a coolant through the reactor or in heat exchange relationship therewith. Specific details of the theory and essential characteristics of such reactors are set forth in co-pending application of Enrico Fermi and Leo Szilard, Serial No. 568,904, filed December 19, 1944, now Patent Number 2,708,656.

In the operation of neutronic reactors at a substantial power, for example, 1000 kilowatts or more, for more than a few minutes difficulty can be encountered due to the fact that the moderator and/or coolant can become highly radioactive due to the projection of fission fragments and/or recoils into the surrounding material during the operation of the reactor if the fissionable material is bare. This result can seriously complicate operation of the reactor since the radioactivity of the coolant and moderator may constitute a serious hazard to personnel if not completely shielded.

Improved neutronic reactors have been produced wherein the tendency of the moderator and/or coolant to become radioactive is substantially minimized. It has been found that this result may be secured by interposing a solid non-fissioning barrier between the fissioning isotope and the coolant or moderator or both. Notwithstanding the fact that introduction of non-fissioning isotopes into a neutronic reactor absorbs neutrons and, therefore, may tend to prevent establishment of a neutron chain reaction, it has been discovered that it is possible to insert non-fissioning barriers into the reactor, and to so proportion the thickness of the barrier to prevent passage of all or a preponderant amount of fission fragments and/or recoils from the fissioning isotope into the moderator and/or coolant while yet avoiding use of such a quantity of barrier that the neutron absorption thereof prevents establishment or maintenance of the neutron chain reaction. The barrier itself should be constructed of a material or materials having a low neutron capture cross-section.

In accordance with the present invention it has been found that steel particularly stainless steel which contains corrosion resistant elements such as nickel, chromium and/or cobalt, while having a comparatively high neutron capture cross-section may be used as a barrier or sheath for fissionable bodies in a reactor and has the advantage of withstanding high operating temperatures when the barrier is in contact with a coolant.

In order to promote heat transfer from the fissioning isotope through the barrier to the contacting moderator and/or coolant, the barrier should be in close intimate contact with fissioning composition. Generally, special precautions are observed for this purpose. Thus, a shell forming the non-fissioning barrier or sheath may be drawn or shrunk upon the fissioning component which preferably is in the metallic state. Therefore, the barrier material must be capable of being shrunk or drawn to a very substantial degree so that considerable reduction in the diameter of the sheath or barrier may be effected after the sheath has been fitted upon the fissionable body. It is possible to reduce stainless steel by at least 30 percent and thus obtain a very tight fit on the uranium or other fissionable material. These enclosed fissionable components are used as the active component of a neutronic reactor, and frequently are located in contact with a coolant, such as a gas or liquid coolant, for removal of heat from the enclosed fissionable components and from the reactor. Where the coolant has a corrosive effect upon the fissionable metal or other material, the non-fissioning sheath also serves to protect the fissionable material. In such a case, every precaution, including choice of barrier material, must be taken to prevent the existence or occurrence, following the drawing operation, of pores in the sheath through which the coolant may enter. Stainless steel is suitable for eliminating such pores even in very thin sheaths. Frequently the sheaths are hermetically sealed about the fissionable material in order to seal the material from the coolant. The problem of welding or otherwise sealing the sheath or barrier about the fissionable material presents difficulties which are readily overcome by the use of stainless steel as the sheathing material.

As previously noted, lengths of the fissionable bodies generally are disposed in channels extending through or at least into the moderator. During the chain reaction the central interior portion of these bodies frequently rises to a temperature much above the temperature of the body exterior which is in close relationship with the coolant. The barrier material must, therefore, be capable of withstanding the temperature of contact with the fissionable component without deteriorating.

The provision of a new article composing a fissionable component and an enclosure or barrier therefor which is capable of surmounting the foregoing difficulties and problems constitutes the principal objects and advantages of the invention, others of which will become apparent from the following description and drawings in which.

Figure 1:
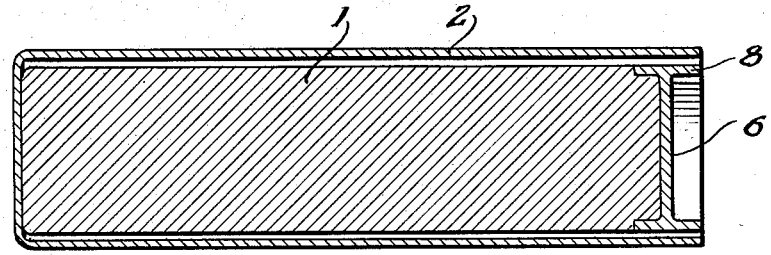
Fig. 1 is a longitudinal sectional view of a fissionable body loosely enclosed in a barrier or sheath of steel.
Figure 2:
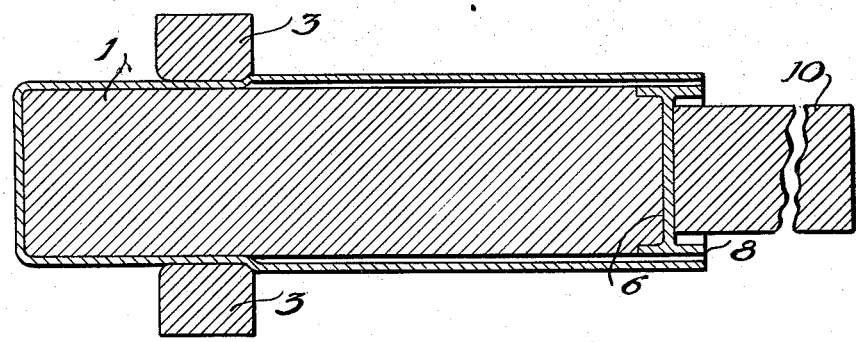
Figure 2 illustrates the assembly of the steel jacket or barrier as it is drawn through a die into tight contact with the fissionable body.
Figure 3:
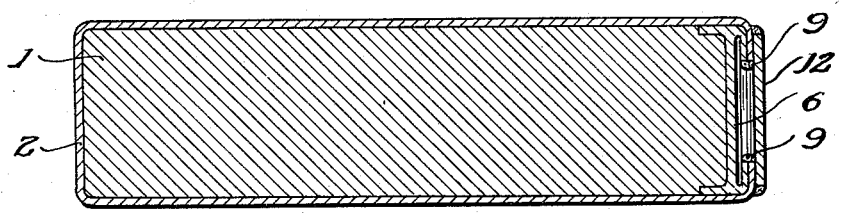
Figure 3 is a longitudinal view of the completely sealed, jacketed body.

As illustrated in the drawings, the invention generally comprises a protective coating or jacket 2 of stainless steel completely enclosing and sealing a uranium rod 1.

Inasmuch as the stainless steel protective coating or jacket has the property of absorbing neutrons to some extent, it is desirable to maintain the quantity of the steel within the pile at a minimum, in order to make possible a chain reaction therein as previously discussed. Consequently, the thickness of the steel tubes and jackets should be maintained at the minimum required from the standpoint of strength, possible corrosion and erosion, and ability to restrain fission products to a substantial degree. Where the jacketed bodies are exposed directly to the attack of a corrosive coolant, such as water, the jacket should be hermetically sealed in order to prevent leakage. Hermetically sealing the uranium rods or tubes in very thin jackets of material having small resistance to neutron passage poses a problem rather difficult of solution. The thickness of the jackets for the uranium tubes generally is of the order of 0.005 to 0.035 inch.

For convenience in handling the uranium rods or tubes, they generally are made in relatively short lengths, for instance, about 8 inches in length. Several methods may be employed for hermetically sealing the uranium body 1 in the thin jacket 2 of stainless steel or similar material.

A disc 6 of stainless steel serves as a closure, and is tightly welded to the open end of the jacket. If desired, disc 6 may be provided with a rim or other projection 8 projecting outwardly from the outer surface of the disc, and concentrically contiguous to the open end of the jacket 2. Sealing closed the open end of the jacket 2 is accomplished by welding together the jacket 2 and the cap rim 8 as at 9.

The assemblage may be constructed in the following manner. The uranium rod 1 of proper dimensions is shot blasted, cleaned and polished. Thereafter, the rod 1 and cap 6 are introduced into the can or jacket 2, and the can is placed in a tightly fitting steel sleeve or die 3. Thereupon, the jacketed uranium rod and cap are forced by hydraulic pressure exerted upon piston 10 through the die usually at an elevated temperature. A second pass through a more restricting die may be desirable to insure tight contact of the jacket with the rod. The assemblage is then chilled; the edges of the cap rim 8 and the jacket are welded together; and the extending edges turned inwardly into contact with the end cap 6. A second or outer stainless steel cap 12 is thereafter welded to the jacket 2 exterior of the inner cap or disc 6.

The jacketed bodies after production may be disposed in the channels of a neutronic reactor in end to end relationship. The usual structure of a carbon moderated reactor comprises a carbon cube with horizontal channels in which the jacketed fissionable bodies lie and through which the coolant passes. The jacketed bodies herein described may be used effectively in this or other type of reactor. Fissionable bodies other than natural uranium such as $U^{238}$, $U^{235}$ mixtures containing more than natural concentrations of $U^{235}$ or other $Th^{232}$ or $U^{238}$ mixtures with fissionable isotopes such as $U^{233}$, $U^{235}$ or $94^{239}$ may be provided with a sheath as herein contemplated.

It will be apparent to those skilled in the art that various modifications may be made without departing from the principles of the invention as disclosed herein, and for that reason, it is not intended that the invention should be limited other than by the scope of the appended claims.

What is claimed is:

1. An article of manufacture comprising, a cylindrical container having at least one open end, a cylindrical solid body snugly disposed within the container, the wall of the container being bent around the body at the open end of the container leaving an aperture, an inner cap and an outer cap, the inner cap being disposed between the solid body and the open end of the container and having peripheral edges extending therefrom conforming to the wall of the container, the inner cap being sealed to the bent portion of the container, and the outer cap being sealed about the aperture in the container.

2. An article of manufacture comprising the elements of claim 1 wherein the container and outer cap are constructed of stainless steel.

3. An article of manufacture comprising the elements of claim 2 wherein the solid body contains a material fissionable by neutrons of thermal energy.

4. An article of manufacture comprising, in combination, a solid body, a container disposed about said body having at least one open end, an inner cap, and an outer cap, the inner cap being disposed between the outer cap and the solid body and being provided with an extension at the extremity thereof conforming to the inner surface of the container, the portion of the container adjacent to the open end and the adjacent portion of the extension being bent inwardly around the end of the solid body and sealed together, and the outer cap being sealed to the exposed surfaces of the container adjacent to the aperture.

5. An article of manufacture comprising the elements of claim 4 wherein the container and outer cap are constructed of stainless steel.

References Cited in the file of this patent

UNITED STATES PATENTS

| | | |
|---|---|---|
| 2,074,348 | Stewart | Mar. 23, 1937 |
| 2,232,634 | Roberts | Feb. 18, 1941 |

FOREIGN PATENTS

| | | |
|---|---|---|
| 861,390 | France | Oct. 28, 1940 |